3,558,585
POLYMERIZATION OF VINYL CHLORIDE
Jean Chatelain, Lyon, and Georgette Steinbach-Van Gaver, Cornod par Arinthod, France, assignors to Produits Chimiques Pechiney-Saint-Gobain, Paris, France
No Drawing. Filed July 24, 1968, Ser. No. 747,070
Claims priority, application France, July 26, 1967, 115,801
Int. Cl. C08f 1/04, 1/62, 3/30
U.S. Cl. 260—92.8                        11 Claims

ABSTRACT OF THE DISCLOSURE

Vinyl chloride is polymerized alone or with compatible monomers in mass, at low temperature with an initiator of oxido-reduction type including a peroxy compound which liberates active oxygen and a reducer of the class of the sulfinates being of the formula:

$$CH_3-SO_2-\underset{\underset{R_2}{|}}{\overset{\overset{R_1}{|}}{C}}-\underset{\underset{R_4}{|}}{\overset{\overset{R_3}{|}}{C}}-SO_2Na$$

each R being one of a class consisting of hydrogen and the linear radicals of the formula $C_nH_{2n+1}$.

---

This invention relates to the polymerization in mass at low temperature of vinyl chloride. The term polymerization of vinyl chloride includes homopolymerization and copolymerization in admixture with compatible monomers. As the list of compatible monomers is large and is found in publications, it will not be reepated here except by illustrative examples.

It has heretofore been proposed to initiate the polymerization of vinyl chloride in mass at low temperature by means of oxido-reduction systems containing a peroxy compound such as a peroxide, a hydroperoxide, a persalt, and hydrogen peroxide, and a reducer. It has also been proposed to initiate polymerization reaction of this type by means of salts of metals of multiple valences. However, the practice of such systems has been difficult because of the reluctant dissolution of some of the ingredients, or by lack of thermal stability, or by the production of colored products.

The polymerization in mass of vinyl chloride proceeds generally in two temperature ranges called high-temperature and low-temperature polymerization. In the high-temperature polymerization, the reaction goes forward at temperatures which are generally above 20° C., frequently around 40°–50° C.; while in the low-temperature process the temperatures are generally below 0° C. The products of the high and low temperature reactions differ in their properties, the low-temperature process producing products of particularly interesting properties. The present invention is a low temperature process which is carried out between —50° C. and 0° C. and preferably between —30° C. and —10° C. The products are of excellent quality as to regularity of structure and resistance to solvents and they possess a high Vicat point.

It is an object of the invention to present a system for polymerizing vinyl chloride which is particularly suitable in ease of operation, and in regularity of polymerization.

The objects of the invention are accomplished, generally speaking, by a method of polymerizing vinyl chloride with or without compatible comonomers, in mass, at low temperature, which comprises carrying out the operations of polymerization or copolymerization in admixture with a peroxy compound which liberates active oxygen and a reducer of the class of the sulfinates being of the formula:

$$CH_3-SO_2-\underset{\underset{R_2}{|}}{\overset{\overset{R_1}{|}}{C}}-\underset{\underset{R_4}{|}}{\overset{\overset{R_3}{|}}{C}}-SO_2Na$$

in which each R is one of class consisting of hydrogen and the linear radicals of the formula $C_nH_{2n+1}$.

Among the peroxy compounds liberating active oxygen in the reaction mass are organic peroxides, hydroperoxides, and persalts. Acetylcyclohexanesulfonyl peroxide and acetylcyclopentanesulfonyl peroxide are illustrative of the peroxy compounds and constitute preferred members of the class. The sulfinate reducers are generally prepared by the alkaline hydrolysis of polysulfones having the general formula:

$$\left(\underset{\underset{R_2-R_4}{|\ \ |}}{\overset{\overset{R_1-R_3}{|\ \ |}}{C-C}}-SO_2\right)_n$$

by the method of Marvel (JACS, 1954, 76, pp. 61–69), $R_1$–$R_4$ having the definition given hereinabove. Among the reducers used in this invention, being of the formula given hereinabove, the preferred sulfinates are the 2-methyl-sulfonyl-1-alkane-sodium sulfinates which are of the formula:

$$CH_3-SO_2-CH-CH_2-SO_2Na$$
$$\underset{R}{|}$$

in which R is one of the class consisting of hydrogen and the linear radicals of the formula $C_nH_{2n+1}$.

The preferred member is 2-methyl-sulfonyl-1-propane-sodium sulfinate of the formula:

$$CH_3-SO_2-CH-CH_2-SO_2Na$$
$$\underset{CH_3}{|}$$

In making up the novel reaction mass, it is helpful to use from about 2 to about 20% of a solvent for the sodium sulfinate. Aliphatic alcohols of low molecular weight are satisfactory; for instance, methanol, but other typical organic solvents are quite useful. The reaction is facilitated if the reaction mass contains a quantity of peroxy compound which liberates from .001 to .04% of active oxygen and preferred results are obtained if the percent of active oxygen is kept between .01 and .03%. Similarly, the quantity of sulfinate is advisably kept to an amount which is equivalent to about .1 to 2% of 2-methyl-sulfonyl-1-propane-sodium sulfinate, a preferred range being between .5 to 1%. The presence of a little water, for instance .1 to 2%, and preferably .5 to 1% is beneficial. The solvent employed should be equivalent to about 2 to 20% of methanol and for preferred results to about 7 to about 12% of methanol.

The invention also includes the control of chain length of the polymers produced, which enables the manufacturer to vary their length at will and to produce wide variations in the properties of the product. When it is desirable to reduce the length of the polymer chains, a chain transfer agent is added to the reaction mass. Among such agents are the halogenated hydrocarbons, for instance those which are chlorinated or brominated and of which tetrachlorethane, trichlorethylene, dichlorethylene, perchlorethylene are exemplary. By increasing the content of transfer agent, the length of the chains is reduced at will. This is so successful that one may produce at will products having viscosities from 100 to 1000 by the Afnor test NF 51.013.

The polymers and copolymers which are produced by this system are particularly useful in the production of textile fibers, of tubes resistant to high temperatures, and to calendered plates for shaping things under vacuum. The following examples illustrate the invention without imposing limitations upon the generalities elsewhere herein set forth.

EXAMPLE 1

The apparatus employed was a 1 liter autoclave equipped with an agitator and a liquid jacket through which methanol was circulated as a refrigerant. The autoclave was thrice evacuated and filled with nitrogen after each evacuation. It was then charged in succession with 1.6 g. 2-methyl-sulfonyl-1-propane-sodium sulfinate; 1.5 g. of water; 200 g. of vinyl chloride. The mass was cooled to −20° C. and there was added to it enough acetylcyclohexanesulfonyl peroxide in methyl phthalate to produce 0.027 g. of active oxygen. The temperature was then allowed to rise to −10° C. at which the reaction was continued 10 hours. The unreacted monomer was removed under vacuum. The yield was 150 g. of polyvinyl chloride which had an Afnor viscosity index, at 0.5% in cyclohexanone at 25° C., of 350.

EXAMPLE 2

An autoclave of 20 liter capacity equipped similarly to that of Example 1 was thrice evacuated and filled of nitrogen after each evacuation. It was then charged with a quantity of acetylcyclohexanesulfonyl peroxide in methyl phthalate solution to produce 1.89 g. of active oxygen; 8 kg. of vinyl chloride, of which 1 kg. was vented to purge the autoclave; the reaction mass was maintained at −20° C. and received 56 g. of the 2-methyl-sulfonyl-1-propane-sodium sulfinate in 52.5 g. of water and 840 g. of methanol. The temperature was allowed to rise to −17° C. and kept there 15 hours. After the unreacted monomer had been removed, the yield, after drying, was 6.7 kg. of powdery polyvinyl chloride having an Afnor viscosity index of 345.

EXAMPLE 3

Operating as in Example 2 the temperatures were changed being first set at −30° C. then, when the rise in temperature became appropriate, it was permitted to attain −25° C. At the end of 15 hours at that temperature and after drying, 4.7 kg. of powdery polymer were obtained.

EXAMPLE 4

The procedure of Example 2 was followed except that 700 g. of perchlorethylene were added as a chain transfer agent, amounting to 10% of the weight of the reaction medium. After 15 hours of polymerization 5.3 kg. of dry powdery polymer were recovered constituting a yield of 75%. The product had a viscosity index of 120 and a Vicat point of 97° C.

EXAMPLE 5

Operating as described in Example 2, 2.33 kg. of transdichlorethylene-1,2 (33% by weight) were added. The powdery polymer weighed 5 kg. and had an Afnor viscosity of 110 and a Vicat point of 96° C.

EXAMPLE 6

An autoclave of 100 liter capacity received in sequence enough acetylcyclohexanesulfonyl peroxide in methyl phthalate solution to yield 5.4 g. of active oxygen, 28 kg. of vinyl chloride of which 3 kg. were vented to remove the gases in the autoclave; the contents were reduced to −20° C. and 141 g. of the 2-methyl-sulfonyl-1-propane-sodium sulfinate in 263 g. of distilled water and 2,275 g. of methanol were added. Polymerization continued for 15 hours at −17° C. After venting the unreacted monomer and drying the product, 20 kg. of polyvinyl chloride powder with a viscosity index of 515 were recovered.

EXAMPLE 7

The autoclave of Example 6 was used to receive enough acetylcyclohexanesulfonyl peroxide in methyl phthalate to produce 1.7 g. of active oxygen, 28 kg. of vinyl chloride monomer of which 3 kg. were vented to purge the autoclave. 50 g. of 2-methyl-sulfonyl-1-propane-sodium sulfinate in solution in 94 g. of water and 1,625 g. of methanol. Polymerization went forward at −17° C. for 15 hours and produced 18.4 kg. of polyvinyl chloride powder with an Afnor viscosity index of 740, a yield of 74%.

EXAMPLE 8

The autoclave of Example 6 received enough acetylcyclohexanesulfonylperoxide in methyl phthalate to produce 0.34 g. of active oxygen. 28 kg. of vinyl chloride monomer were added and 3 kg. were vented to purge the autoclave; 10 g. of 2-methyl-sulfonyl-1-propane-sodium sulfinate were added in 18 g. of water and 1,625 g. of methanol. Polymerization was at 17° C. for 15 hours, after which the residual monomer was vented and 10 kg. of polyvinyl chloride having a viscosity index of 880 were recovered, a yield of 40%.

EXAMPLE 9

An autoclave of 3 liter capacity made of stainless steel and provided with an agitator system and a rubber membrane for the introduction of reactants by means of a hypodermic syringe was cooled to a temperature of −13° C. and received 150 g. of methanol, 15 g. of water, and 300 g. of vinyl acetate. After purging with nitrogen, 1350 g. of vinyl chloride were introduced and 150 g. of it were vented to purge the autoclave. After the apparatus was sealed, it received through the membrane 18.75 cc. of a solution of acetylcyclohexanesulfonyl peroxide containing 2.2 g. of active oxygen per 100 cc. and 50 cc. of a solution of 5.5 g. of 2-methyl-sulfonyl-1-propane-sodium sulfinate in 50 cc. of methanol. The reaction began immediately. The temperature was maintained at −12° C. for 6 hours. The autoclave was then opened and the reaction mixture was plunged into methanol at −15° C. containing 1% hydroquinone. After filtration and drying, 600 g. of copolymer were obtained, an over-all yield of 40% and an hourly yield of 6.6%. The proportions of vinyl chloride to vinyl acetate were 88:12.

EXAMPLE 10

The operation was as in Example 9 but the charge of the comonomeric composition was composed of 150 g. of propene and 1350 g. of vinyl chloride. 450 g. of copolymer were recovered, an over-all yield of 30% and an hourly yield of 6%. The copolymer contained a proportion of vinyl chloride to propylene of 96:4.

EXAMPLE 11

Operating as in Example 9 but the comonomers included 75 g. of vinyl acetate, 1350 g. of vinyl chloride, and 75 g. of propene. After 6 hours of copolymerization with agitation at −12° C., 400 g. of a ternary copolymer were obtained as a powder representing a global yield of 26% and an hourly yield of 4.3%. The composition of the copolymer was vinyl chloride 96%, vinyl acetate 2.5%, and propene 1.5%.

As many apparently widely different embodiments of the present invention may be made without departing from the spirit and scope thereof, it is to be understood that the invention is not limited to the specific embodiments.

What is claimed is:

1. A method of polymerizing vinyl chloride with or without compatible comonomers, in mass, at low temperature, which comprises carrying out the operations of polymerization or copolymerization in admixture with a peroxy compound which liberates active oxygen and a reducer of the class of the sulfinates being of the formula:

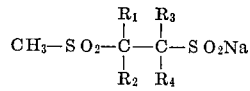

each R being one of a class consisting of hydrogen and lower alkyl.

2. A method according to claim 1 in which the peroxy compound is of the class consisting of the organic peroxides, the hydroperoxides, and the persalts.

3. A method according to claim 2 in which the peroxy compound is the acetylcyclohexanesulfonylperoxide.

4. A method according to claim 1 in which the peroxy compound is the acetylcyclopentanesulfonylperoxide.

5. A method according to one of the precedent claims in which the reducer is an 2-methyl-sulfonyl-1-alkane-sodium sulfinate.

6. A method according to claim 5 in which the reducer is 2-methyl-sulfonyl-1-propane-sodium sulfinate.

7. A method according to claim 1 in which the temperature is between −50° C. and 0° C. and preferably between −30° C. and −10° C.

8. A method according to claim 1 in which the reaction is carried out in admixture with 2–20% of a solvent for the sodium sulfinate, the said solvent being one of the group consisting of aliphatic alcohols of low molecular weight, and being specially methanol.

9. A method according to claim 1 in which the reaction is carried out in admixture with a small quantity of water.

10. A method according to claim 1 in which the reaction mass comprises:

a quantity of peroxy compound which liberates from .001 to .04% of active oxygen and preferably .01 to .03%;

a quantity of 2-methyl-sulfonyl-1-propane-sodium sulfinate which is equivalent to .1 to 2% and preferably .5 to 1%;

a quantity of water equivalent to .1 to 2% and preferably .5 to 1%;

a quantity of methanol equivalent to 2 to 20% and preferably 7 to 12%.

11. A method according to one of the precedent claims in which the reaction is carried out in admixture with a chain transfer agent.

References Cited

UNITED STATES PATENTS 3,509,109   4/1970   Buning et al. _____ 260—92.8

JOSEPH L. SCHOFER, Primary Examiner

J. A. DONAHUE, JR., Assistant Examiner

U.S. Cl. X.R.

260—87.1, 87.5